C. H. DUFFY.

SPARK PLUG.

APPLICATION FILED MAR. 13, 1920.

Reissued May 25, 1920.

14,862.

Inventor

Charles H. Duffy

UNITED STATES PATENT OFFICE.

CHARLES HUGH DUFFY, OF CHEVY CHASE, MARYLAND.

SPARK-PLUG.

14,863. Specification of Reissued Letters Patent. Reissued May 25, 1920.

Original No. 1,190,130, dated July 4, 1916, Serial No. 740,502, filed January 6, 1913. Application for reissue filed March 13, 1920. Serial No. 365,642.

*To all whom it may concern:*

Be it known that I, CHARLES HUGH DUFFY, a citizen of the United States, residing at Chevy Chase, in the county of Montgomery and State of Maryland, have invented new and useful Improvements in Spark-Plugs, of which the following is a specification.

This invention relates to spark-plugs for internal combustion engines, and has for its object to provide a spark-plug so designed, constructed and arranged as to obviate the tendency to short-circuit the secondary current employed.

An object of the invention is to so construct the insulator and the central electrode as to relieve the insulator of any undue stress or strain which would tend to crack or disrupt the same.

The co-efficient of expansion of metals varies considerably, and according to the alloys thereof, and it might be said as a general proposition that there is no metal or alloy suitable for use as spark-plug electrodes, whose co-efficient of expansion is the same as that of porcelain which is the usual material of which spark-plug insulators are constructed. The consequence of this is that when the plug is subjected to the heat generated in an internal combustion engine, the expansion and contraction of the central metal electrode differs from the expansion and contraction of the surrounding insulator; thus placing upon the insulator undue stresses and strains which frequently result in cracking or disrupting the insulator.

This invention consists of the novel construction and arrangement of the electrodes of the plug, and in so forming the same that a strong capillary attraction is exerted at the spark gap of the plug to break a bridge of liquid which may form at the spark-gap.

The invention further consists in constructing the lower portion of the insulator with an annularly chambered exterior, the annularly chambered portion being provided with a central chamber crossing the plane of the annular chamber or chambers so as to provide an annular insulating wall out of contact with the central electrode, which wall has cross-sectional areas at the planes of the annular chamber or chambers which are less than the cross-sectional areas of said wall at a plane or planes below said annular chamber or chambers. The said central chamber is of such capacity as to freely and positively permit entrance therein of the hot gases from the combustion chamber of the motor, while the annular chamber or chambers are so disposed as to freely permit entrance therein of the said hot gases from the motor. This central chamber provides for the positive heating of the interior of the insulator, (instead of the positive cooling of the same by conduction to the central electrode as is usual) and causes the heat which is received in the large cross-sectional areas of the insulating wall to be dammed therein by throttling the conduction of heat at the small cross-sectional areas of the insulating wall. Thus the lower portion of the insulator is, in operation, maintained at a sufficiently high temperature to prevent the formation of carbon thereon; while this construction also provides for free relative expansion and contraction of the central electrode and of the said annularly chambered portion of the insulator.

The invention further consists of certain other novel details of construction and of combinations of parts, all of which will be first fully described and afterward specifically pointed out in the appended claims.

Referring to the accompanying drawing.

Like numerals of reference indicate the same parts throughout the several figures in which.

Figure 1:
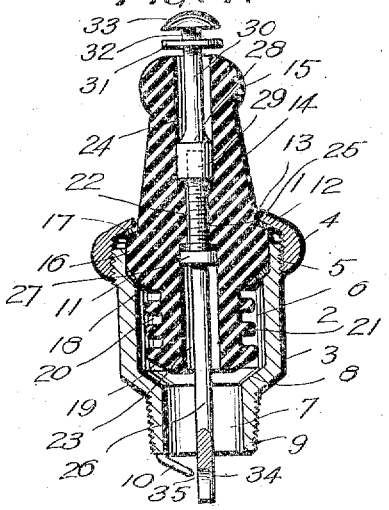
Figure 1 is a vertical sectional view of a spark-plug constructed in accordance with this invention.

1 indicates the spark-plug and 2 the metal shell, said shell 2 comprising the lower body portion 3 and the gland 4, the said two parts being threaded together at 5 in the manner as illustrated in Fig. 1.

The lower body portion 3 of the shell is provided with a relatively large bore 6 which communicates with the lower relatively small bore 7; an inclined shoulder 8 being formed between the two bores 6 and 7 in the manner as illustrated in Fig. 1; the extreme lower portion of the shell surrounding the bore 7 being threaded at 9 for threaded connection with the combustion chamber of an internal combustion engine.

10 indicates the lower electrode of the plug which is preferably secured to the lower threaded end 9 in any convenient manner; the body portion 3 of the shell being provided above the enlarged chamber 6 with a shoulder 11 to receive the insulating core in the manner as shown in Fig. 1; while the gland 4 of the shell is provided with an inwardly extending annular portion 12 to engage the insulating core in the manner as shown in the drawing, the said gland 4 being provided with an opening 13 sufficiently large to permit of the said gland passing freely over the outer portion of the insulating core.

14 indicates the insulating core of the plug which may be constructed of any suitable heat resisting insulating material, the same being preferably shaped in the manner as illustrated in Fig. 1, the extreme upper portion being preferably swelled as illustrated at 15, the core being provided at substantially the center thereof with an enlargement 16 providing suitable shoulders 17 and 18 for engagement with the body portion and gland of the shell.

19 indicates the lower inclosed portion of the insulating core, said lower inclosed portion being provided with a plurality of annular chambers 20, while a plurality of annular webs or flanges 21 is formed on the lower inclosed portion of the insulating core by reason of the annular chambers 20, the same being preferably arranged in the manner as shown in Fig. 1. About midway of the insulating core is provided a small central longitudinal bore 22, while the lower inclosed portion of the insulating core is provided with a relatively large central bore 23 crossing the planes of the annular chambers 20, thus forming an annular insulating wall spaced from and out of contact with the central electrode. The upper exposed portion of the insulating core is provided with a relatively large central bore 24, said bores 23 and 24 communicating with the small central bore 22, thereby forming a shoulder above and below the said small central bore 22 in the manner as shown in the drawing.

25 indicates the upper threaded portion of the central electrode 26, said central electrode 26 being provided with a swell 27 or with a small threaded nut, said swell or small threaded nut 27 being of a size to enter the large bore 23 in the lower inclosed portion of the insulating core and to engage the shoulder below the small central bore 22 in the manner as shown in Fig. 1; a suitable gasket or other packing means can be employed to prevent leakage through the insulating core in the usual manner.

28 indicates the upper portion of the central electrode which as shown in the drawing, is provided with a lower enlarged portion 29, said portion 29 being of a size to enter the large bore 24 in the upper portion of the insulating core, the said enlarged portion 29 being internally threaded to receive the threaded end 25 of the lower electrode 26, that part of the upper portion 28 of the electrode being reduced as shown at 30 in order to prevent contact with the wall of the large bore 24 in the manner as shown in Fig. 1. An annular flange 31 is formed above the reduced portion 30 and is of such a size as to cover the end of the large bore 24, but which is not in contact with the upper end of the insulating core; an annular groove 32 being provided above the annular flange 31 to receive a wire terminal, the extreme upper end of the portion 28 being headed at 33 to provide a finish for this portion, the secondary wire terminal being held between the head 33 and the annular flange 31 in the manner which will be apparent from an inspection of the accompanying drawing.

Figure 2:
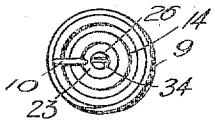
Fig. 2 is a bottom end view of the lower portion of the plug.
Figure 3:
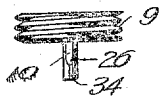
Fig. 3 is a fragmentary view illustrating the lower threaded portion of the plug illustrating the position of the electrodes.

The extreme lower end of the central electrode 26 is provided with a long and relatively narrow longitudinal slot 34, the lower electrode 10 approaching the central electrode 26 at the slotted end thereof so as to provide a spark-gap 35 between the said two electrodes, the relative position of the electrodes being further illustrated in Figs. 2 and 3.

Figure 4:
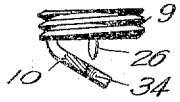
Fig. 4 is a similar view illustrating a modification of the electrodes.

Referring now to Fig. 4, which illustrates a modification of the construction just described, it will be seen that the lower electrode 10 is provided with a long and relatively narrow slot 34 cut into the outside of the wall of the electrode and extending longitudinally of the electrode, the central electrode 26 approaching the said slot 34 in the electrode 10, preferably intermediate the ends of the ground electrode 10 to provide a suitable spark gap between the center electrode and the slot 34 in the ground electrode 10.

Figure 5:
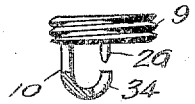
Fig. 5 is a similar view illustrating a still further modification of the electrodes.

In Fig. 5 the lower electrode 10 is curved in the manner as illustrated, the curved end of the electrode being provided with a long and relatively narrow slot 34 extending below the spark gap, the end of which approaches the central electrode 26 to provide a suitable spark gap between the ends of the two electrodes.

Having thus fully described the several parts of this invention, its operation is as follows:

By reason of the law of capillary attraction, liquids are attracted into capillary openings or interstices, the extent of the attraction being governed by the size of the capillary opening or interstice. By forming either the lower end of the central electrode with a long and relatively narrow capillary slot or cut, a capillary attraction is provided for any liquid coming in contact with the end or sides of the said capillary slot or cut. Consequently when the fellow electrode is properly positioned with respect to the said slot or cut, any liquid bridging the spark gap will be drawn into the capillary slot or cut by capillary attraction.

As will appear from the accompanying drawing, the slot or cut which may be formed in either one of the electrodes is arranged longitudinally of the electrode and is open from end to end, although it is not essential to the proper operation of this device that the slot or cut extend entirely through the electrode, as the capillary action will take place even though the slot or cut be partially closed, or even though the slot or cut simply extends partially through the electrode and not entirely across the same, it being of course understood that the exact shape or form of the cut or slot is immaterial as far as any capillary action is concerned, it simply being essential that the slot or cut be of a capillary size so as to attract liquid therein.

Referring now to the construction of the body portion of the central electrode, it will be seen that only the relatively short threaded portion 25 of the central electrode is clamped within the insulating core. Consequently the expansion and contraction of this relatively short piece of metal is quite negligible, as it allows the entire lower inclosed portion of the insulator to freely expand and contract, while the upper portion of the insulator is equally free to expand and contract unhampered by the central electrode, and it is obvious that both the lower and upper portions of the metal electrode are free to expand and contract without clamping or placing upon the insulator any undue stress or strain which would tend to injure the same. The central threaded portion of the central electrode is preferably cemented within the insulator to insure a gas-tight construction and to prevent accidental rotation of the electrode within the insulator.

Referring now to the insulator, it will be seen that the lower inclosed portion thereof, which is provided with annular chambers 20, is of a size which provides an annular space or chamber surrounding the lower inclosed portion of the insulator and between said portion and the inner wall of the metal shell of the plug; while it will be seen that the said lower inclosed portion of the insulator is of a circumference in excess of the lower bore or chamber 7 of the plug. By reason of this construction, when in operation, the extreme lower end of the insulator extends beyond the sides of the lower bore or chamber 7. Upon compression of the engine piston, any carbon or short-circuiting material is thrust against the said extreme lower end of the insulator.

Referring to the upper exposed portion of the insulator, it will be seen that the upper portion 28 of the electrode passes a considerable distance within the relatively large bore 24, the lower enlarged portion 29 of the said electrode member being in contact with the insulator only at the lower portion of said member. When the two parts of the electrode are threaded together and preferably cemented in position, the upper portion of the electrode member 28 is out of contact with the said insulator, and consequently current passing into the upper electrode member 28 does not come in contact with the outer exposed portion of the insulator. It is therefore impossible to effect a leakage of current from the top of the electrode member 28 over the outside surface of the exposed portion of the insulator, thereby obviating all possibility of leakage from the top of the insulator to the metal shell of the plug.

Referring again to the slotted or cut electrode arranged to exert a capillary attraction for liquids bridging or binding to bridge the spark gap, it may be said that this slotted or cut construction of the electrode presents advantages over a tubular electrode from the standpoint of manufacture, and further presents the very material advantage that in the tubular construction of the electrode there is always present the possibility of a small quantity of air becoming trapped in the tubular electrode to prevent the capillary action of the same. With the slotted or cut construction of the electrode, the slot or cut being open its entire length, all possibility of trapping air in the slot or cut is entirely eliminated, and thus capillary action of the slot or cut is at all time assured. A further advantage of slotting the electrode either wholly or partially therethrough, is that a greatly increased heated surface is thereby provided to the extent that the formation of carbon thereon is prevented.

The lower internal bore or chamber 23, through the center of which extends the central electrode 26, forms the lower portion of the insulation into an insulating wall having annular chambers 20 therein, the planes of the annular chambers being crossed by the said lower internal bore or chamber 23. This construction provides for heating the lower portion of the insulator internally as well as externally, and presents alternate portions of large and small cross sectional areas, a large cross sectional area of the wall being below or under a small cross sectional area. This lower portion or wall of the insulator having no central portion or core, and being out of contact with the central electrode, cannot conduct the heat it receives upwardly through the central electrode. Therefore as the heat received in the lower large cross sectional area of the wall cannot be freely conducted across the small cross sectional area, the heat in the said lower large cross sectional area is dammed therein and the conduction therefrom is throttled at the adjacent small cross sectional area, to the extent that, in operation, the said lower or chambered portion or wall does not permit the formation of a coating or of an accumulation of carbon to short-circuit the plug. This action may be increased or diminished according to the number of annular chambers employed and the depths of the same. The deeper the annular chambers and the less the cross sectional areas between their bottoms and the central chamber which crosses their planes, the greater is the throttling action on the conduction of the heat. However, the depth of the chambers should be such as to leave a sufficient cross sectional area between the bottoms of these annular chambers and the wall of the central chamber to insure ample mechanical strength at these points; while the width of the annular chambers should be such as not to necessitate an undue length to the chambered portion of the insulator.

By disposing the lower inclosed portion of the insulator within the enlarged chamber 6, the diameter of the lower inclosed portion of the insulator including the depths of the annular chambers, the size of the central chamber 23, and the thickness of the wall between the central chamber 23 and the annular chambers 20, are not limited to a size as will enter the lower threaded portion 9 of the shell 2. I have found this feature to be of great advantage, as this construction permits a wide latitude as to size, diameter and detailed design of the lower chambered portion of the insulation, which would otherwise be restricted if said chambered portion extended down into the lower bore 7 of the threaded portion 9 of the shell, since said threaded portion 9 must be standardized to fit the standardized openings in motors.

Having thus fully described the invention what I claim as new and desire to secure by Letters Patent of the United States, is:

1. A spark-plug comprising an insulating core, a metal shell and a plurality of electrodes including a central one, said electrodes being separated to provide a spark gap, the said metal shell being provided with an enlarged upper chamber and a smaller lower chamber, the said insulating core being of greater diameter than the said lower chamber and extending into said metal shell providing an annular space between the outer surface of the insulating core and the inner surface of the wall of said enlarged upper chamber, the said insulating core being provided within said upper enlarged chamber with a plurality of deep and relatively narrow annular chambers one above the other, the lower central portion of said insulating core being provided with a relatively large longitudinal bore, the wall of which surrounds but is out of contact with the central electrode of the plug, said longitudinal bore crossing the planes of the annular chambers, the outer portion of the insulating core being provided with a relatively large central longitudinal bore, the wall of which surrounds but is out of contact with the upper portion of the central electrode in such manner that the central electrode is out of contact with the top and outer surface of the insulating core, one of said electrodes being provided at the spark gap with a capillary slot or cut open at the side of the electrode to exert a capillary attraction for liquid bridging the spark gap.

2. A spark plug comprising an insulating core, a metal shell and a plurality of electrodes, said electrodes being separated to provide a spark gap, the said metal shell being provided with an enlarged upper chamber and a smaller lower chamber, the said insulating core being of greater diameter than the said lower chamber and extending into said metal shell providing an annular space between the outer surface of the insulating core and the inner wall of said enlarged upper chamber, the said insulating core being provided within said upper enlarged chamber with a plurality of deep and relatively narrow annular chambers, the chambered portion of the insulating core being wholly contained within the said enlarged upper chamber of the metal shell.

3. A spark plug comprising an insulating core, a metal shell and a plurality of electrodes including a central one and terminal connections, said electrodes being separated to form a spark gap, the lower external portion of said insulating core being annularly chambered and internally provided with a deep and relatively large bore, the wall of which surrounds but is out of contact with the lower portion of the central electrode, said bore crossing the plane of the annular chamber in said annularly chambered insulating core, the upper portion of the insulating core being provided with a deep and relatively large bore in such manner that the central electrode and terminal connections are out of contact with the top and outer surface of the insulation.

4. A spark plug comprising an insulating core, a metal shell and a plurality of electrodes, said electrodes being separated to form a spark gap, the said metal shell being provided with an enlarged upper chamber and a smaller lower chamber, the said insulating core being of greater diameter than the said lower chamber and extending into said metal shell providing an annular space between the outer surface of the insulating core and the inner wall of said enlarged upper chamber, the said insulating core being provided within said upper enlarged chamber with a plurality of deep and relatively narrow annular chambers, and also provided with a central longitudinal chamber, the wall of which chamber surrounds but is positively out of contact with the central electrode, said longitudinal chamber crossing the planes of the annular chambers, the chambered portion of the insulating core being wholly contained within the said enlarged upper chamber of the metal shell.

5. A spark plug comprising an insulating core, a metal shell and a plurality of electrodes, said electrodes being separated to provide a spark gap, the said metal shell being provided with an enlarged upper chamber and a smaller lower chamber, the said insulating core being of greater diameter than the said lower chamber and extending into said metal shell providing an annular space between the outer surface of the insulating core and the inner wall of the said enlarged upper chamber, the said insulating core being provided within said enlarged upper chamber with a plurality of deep and relatively narrow external annular chambers one above the other, and provided with an internal chamber to freely receive heat from a motor for positively heating the interior of the lower portion of the insulator, said internal chamber crossing the planes of the external annular chambers and forming an insulating wall positively separated from and out of contact with the central electrode, the cross sectional areas of said wall at the planes of the annular external annular chambers being less than the cross sectional areas of the wall below and between said annular external chambers, in such manner that heat entering the internal chamber and the annular external chambers and imparted to the lower portion of the insulator, is dammed in said lower portion and its conduction throttled at the planes of the annular external chambers, the chambered portion of the insulating core being wholly contained within the said enlarged upper chamber of the metal shell.

6. A spark plug comprising an insulating core, a metal shell and a plurality of electrodes, said electrodes being separated to form a spark gap, the said metal shell being provided with an enlarged upper chamber and a smaller lower chamber, the said insulating core being of greater diameter than the said lower chamber and extending into said metal shell providing an annular space between the outer surface of the insulating core and the inner wall of the said enlarged upper chamber, the said insulating core being provided within said upper enlarged chamber with a plurality of deep and relatively narrow external annular chambers one above the other, and provided with an internal chamber to freely receive heat from a motor for positively heating the interior of the lower portion of the insulator, said internal chamber crossing the planes of the said external annular chambers, the whole forming an insulating wall positively separated from and out of contact with the central electrode, the said external annular chambers one above the other in the said wall, providing alternately large and small cross sectional areas in said wall, in such manner that heat entering the internal chamber and the external annular chambers and thereby imparted to the lower portion of the insulator, is dammed in the said areas of large cross section and its conduction throttled at the said areas of small cross section, the chambered portion of the insulating core being wholly contained within the said enlarged upper chamber of the metal shell.

7. A spark plug comprising a plurality of electrodes separated to form a spark gap, one of said electrodes being provided at the spark gap with a capillary slot entering the electrode at the side thereof to attract by capillarity a bridge of liquid across the spark gap.

8. A spark plug comprising a plurality of electrodes separated to form a spark gap, and a capillary opening at the spark gap in one of said electrodes lying longitudinally of the electrode to form an elongated aperture in the side wall of the electrode to prevent the bridging of the spark gap.

9. A spark plug comprising a plurality of electrodes separated to form a spark gap, one of said electrodes being provided at the spark gap with a capillary slot entering the electrode from the side thereof to attract by capillarity a bridge of liquid across the spark gap, said capillary slot being positioned in relation to the spark gap to drain excess oil from the slot by gravity.

10. A spark plug comprising a plurality of electrodes separated to form a spark gap, and a capillary opening at the spark gap lying longitudinally of one electrode to provide an elongated aperture in the side of the electrode to attract liquid at the spark gap to prevent the bridging of the spark gap, said capillary opening being positioned in relation to the spark gap to drain excess oil from said capillary opening by gravity.

11. A spark plug comprising an insulating core, a metal shell and a plurality of electrodes, said electrodes being separated to provide a spark gap, the said metal shell being provided with an enlarged upper chamber and a smaller lower chamber, the said insulating core being of greater diameter than the said lower chamber and extending into said metal shell providing an annular space between the outer surface of the insulating core and the inner wall of said enlarged upper chamber, the said insulating core being provided within said upper enlarged upper chamber with a plurality of deep and relatively narrow annular external chambers one above the other, the said chambered portion of the insulating core being wholly contained within the said enlarged upper chamber of the metal shell, the said insulating core being provided with an internal chamber to freely receive heat from a motor to positively heat the interior of the said lower portion of the insulator, the insulator forming a wall around the internal chamber positively separated from and out of contact with the central electrode, the cross sectional areas of said wall at said annular external chambers providing restricted cross sectional areas intermediate the extremities of said internal chamber, in such manner that the portion of said wall below each of said external annular chambers is of greater cross sectional area than the cross sectional areas at the external annular chambers; whereby heat entering the internal chamber and received by the said wall, is dammed in the said areas of greater cross section and its conduction throttled at the areas of restricted cross section.

12. A spark plug including a central electrode and a ground electrode, the ground electrode having in its outer wall a capillary slot open its entire length and presenting an elongated aperture lying in the outer wall of the ground electrode and longitudinally thereof, the end of the said central electrode terminating adjacent the said capillary slot in the ground electrode to form a spark gap between the end of the central electrode and the ground electrode at the said slot; the whole arranged in such manner that the said slot in the outer wall of the ground electrode provides an increased heated surface on the ground electrode throughout the length of the slot to prevent the accumulation of carbon therein, and the said slot, being open its length, prevents the trapping of air or gas therein to interfere with the capillary action of the slot for breaking a bridge of liquid formed across the spark gap.

13. A spark plug comprising a ground electrode and a central electrode, said ground electrode being provided with a capillary slot cut into the side of the electrode and substantially parallel therewith, the said slot being positioned with relation to the end of the central electrode to form a spark gap between the end of the central electrode and the slotted ground electrode at the said slot therein and intermediate the ends of the ground electrode.

14. A spark plug comprising a ground electrode and a central electrode, the ground electrode being provided along its wall with a capillary slot cut into the outside of the wall and extending in a direction substantially parallel with that portion of the electrode in which the slot is cut, the said slot in the electrode being positioned with relation to the central electrode to form a spark gap between the end of the central electrode and the slotted ground electrode at the said slot therein.

In testimony whereof I affix my signature.

CHARLES HUGH DUFFY.